V. J. WELCOME.
MEAT POUNDER.
APPLICATION FILED APR. 9, 1918.

1,272,743.

Patented July 16, 1918.

INVENTOR
VIRGIL J. WELCOME
BY Hazard & Miller
ATT'YS.

UNITED STATES PATENT OFFICE.

VIRGIL JULIUS WELCOME, OF LOS ANGELES, CALIFORNIA.

MEAT-POUNDER.

1,272,743.  Specification of Letters Patent.  Patented July 16, 1918.

Application filed April 9, 1918. Serial No. 227,598.

*To all whom it may concern:*

Be it known that I, VIRGIL JULIUS WELCOME, a citizen of the United States, residing at Los Angeles, in the county of Los Angeles and State of California, have invented new and useful Improvements in Meat-Pounders, of which the following is a specification.

My object is to make an improved meat pounder and my invention consists in the novel features herein shown, described and claimed.

Figure 1:
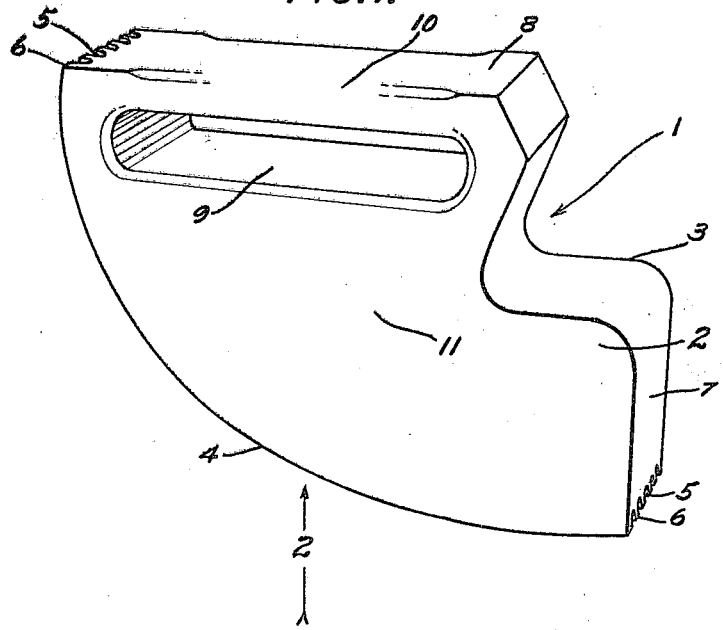
Figure 1 is a perspective of a meat pounder embodying the principles of my invention.
Figure 2:
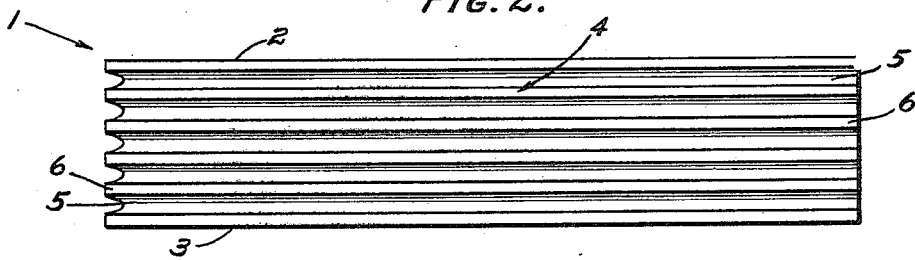
Fig. 2 is an edge view as seen looking in the direction indicated by the arrow 2 in Fig. 1.

The meat pounder is a solid metal block 1 having parallel flat sides 2 and 3, and a curved working face 4 at right angles to the sides, said working face being substantially a quarter of a circle in side elevation. The working face 4 is provided with a plurality of longitudinally extending parallel grooves 5, said grooves being evenly spaced apart to produce the flat faced ribs 6, the face of each rib 6 being substantially one-half the size of the width of each groove 5. The curvature of the face 4 makes a rocker. The face 7 of the block is radial to the working face 4, and the face 8 is at right angles to the face 7. A hand-hole 9 is formed transversely through the block parallel with the face 8, thereby producing a hand-hold 10.

The operator grasps the hand-hold 10, places the meat to be operated upon upon a block or table, and places the meat pounder upon the meat and rocks the pounder back and forth upon the working surface 4. When desired the pounder may be reciprocated up and down and used like a hammer. The main portion 11 of the block between the working face 4, the face 7, and the hand-hole 9 is of considerable weight.

While, in the ordinary operation of my meat pounder, one hand is sufficient, the same may be operated by two hands, the left hand grasping the handle 10 and the right hand the recess to the right adjacent thereto, thereby enabling the user of the meat pounder to bear his whole weight thereon.

By means of my meat pounder even tough meat may be made tender and soft so that the same may be cut with a fork. This is due to the fact that the ribs 6 break the meat fiber thoroughly, thereby rendering meat tender.

Various changes may be made in the details of construction without departing from the spirit of my invention as claimed.

I claim:

A meat pounder comprising a solid heavy metal block having parallel flat sides and a curved working face at right angles to the sides; said working face being substantially a quarter of a circle in side elevation and there being a plurality of longitudinally extending parallel grooves in said working face; said grooves being evenly spaced apart to produce flat-faced ribs; the face of each rib being equal to substantially one-half the width of each groove and the curvature of the face serving to make a rocker; the faces at the ends of the rocker face being at right angles to each other and there being a hand-hold transversely through the block parallel with one face.

In testimony whereof I have signed my name to this specification.

VIRGIL JULIUS WELCOME.

Copies of this patent may be obtained for five cents each, by addressing the "Commissioner of Patents, Washington, D. C."